(12) United States Patent
Packman et al.

(10) Patent No.: US 8,032,004 B2
(45) Date of Patent: Oct. 4, 2011

(54) MULTIMEDIA PRESENTATION FORMAT

(75) Inventors: Dagan Packman, Longmont, CO (US); Steven Bernard Volk, Boulder, CO (US); Jerry E. Hurst, Jr., Boulder Creek, CA (US); Alan Fennema, San Jose, CA (US)

(73) Assignee: Vmedia Research, Inc., Boulder, CO (US)

( * ) Notice: Subject to any disclaimer, the term of this patent is extended or adjusted under 35 U.S.C. 154(b) by 1085 days.

(21) Appl. No.: 11/891,892

(22) Filed: Aug. 14, 2007

(65) Prior Publication Data

US 2008/0273115 A1 Nov. 6, 2008

Related U.S. Application Data

(60) Provisional application No. 60/837,530, filed on Aug. 14, 2006.

(51) Int. Cl.
*H04N 5/775* (2006.01)
*H04N 5/765* (2006.01)
*H04N 5/92* (2006.01)
*H04N 5/93* (2006.01)
*G09G 5/00* (2006.01)

(52) U.S. Cl. ........ 386/230; 386/232; 386/326; 386/353; 345/660

(58) Field of Classification Search ........................ None
See application file for complete search history.

(56) References Cited

U.S. PATENT DOCUMENTS

| | | | | |
|---|---|---|---|---|
| 5,426,723 A * | 6/1995 | Horsley | ........................ | 345/428 |
| 5,793,350 A * | 8/1998 | Chandavarkar et al. | ...... | 345/667 |
| 6,141,061 A * | 10/2000 | Takeuchi | ...................... | 348/581 |
| 6,501,509 B1 * | 12/2002 | Han, II | ......................... | 348/441 |
| 6,683,655 B2 * | 1/2004 | Han, II | ......................... | 348/581 |
| 6,718,072 B1 * | 4/2004 | Sekiya et al. | ................. | 382/298 |
| 6,825,857 B2 * | 11/2004 | Harasimiuk | ................. | 345/660 |
| 6,954,219 B2 * | 10/2005 | Hermanson | .................... | 345/660 |
| 7,071,992 B2 * | 7/2006 | Chen et al. | .................... | 348/441 |
| 7,450,179 B2 * | 11/2008 | Higashi et al. | ................ | 348/555 |
| 2003/0117419 A1 * | 6/2003 | Hermanson | ................... | 345/660 |
| 2005/0162670 A1 * | 7/2005 | Shuler, Jr. | ...................... | 358/1.2 |

\* cited by examiner

*Primary Examiner* — Thai Tran
*Assistant Examiner* — Gelek W Topgyal
(74) *Attorney, Agent, or Firm* — Patentability Associates

(57) ABSTRACT

A format for accessing content such as a full-length move from an optical disc uses an XML description file stored on the disc to generate one or more screens that a user employs to access the content. The decoding requirements of a hardware or software player are reduced by discarding specific elements of an encoding standard such as MPEG4 that is used to encode the content on the disc. The maximum average and peak bitrates at which the data is transferred are limited to further reduce the demands on the player.

1 Claim, 2 Drawing Sheets

MULTIMEDIA PRESENTATION FORMAT

CROSS-REFERENCE TO RELATED APPLICATIONS

This application claims the priority of Provisional Application No. 60/837,530, filed Aug. 14, 2006, which is incorporated herein by reference in its entirety.

BACKGROUND OF THE INVENTION

Until now, data-intensive content such as full-length movies has been stored on DVD discs and displayed on devices such as laptop computers, but it has not been stored and displayed with high quality (e.g., DVD quality or better) on miniature hand-held devices such as mobile phones and personal data assistants (PDAs). One of the problems has been to develop a presentation format that provides a fast and efficient system for accessing the content of an optical disc and for playing the audio and video content of the disc back at a high level of reproduction quality and without placing undue demands on the microprocessor in the device.

This invention overcomes those problems.

BRIEF SUMMARY OF THE INVENTION

In accordance with this invention, the content of an optical disc or other media is accessed by a hardware or software player using a description file on the disc, which is preferably an Extensible Markup Language (XML) file. The description file contains one or more file object descriptions, as well as file location information, and audio/video presentation information. Each file object description is associated with graphic, video or audio objects that are stored on the disc or other media, and the hardware or software player uses the objects to composite a screen viewable by the user on a display. The screen typically contains buttons that the user may select to trigger actions such as beginning the playback of a presentation or moving on to other screens.

An application program interface (API) includes a limited set of commands (e.g., to begin a playback) so as to reduce the possibility of incompatibilities between the commands.

In one embodiment the presentation is encoded using MPEG4 AVC, but after discarding certain elements from the standard MPEG4 AVC profiles and levels to reduce the set of decoder requirements. For example, the 4:0:0 color format and video field coding (interlacing) may be removed to reduce the player decoding requirements list. In addition, the average and peak bitrates of the audio and video data are limited to reduce the demands on the hardware or software player.

DETAILED DESCRIPTION OF THE INVENTION

A disc according to this invention is played in a device that contains an optical disc drive and a software player environment, which is capable of playing back content stored on the disc. Alternatively, the device may contain an optical disc drive and a hardware playback environment. In one embodiment, disc drive is housed within a mobile phone and the content comprises entertainment content such as a full-length movie. In other embodiments the disc drive may be housed within other types of devices, such as PDAs, and the disc may contain other types of content, such as educational content.

Figure 1A:
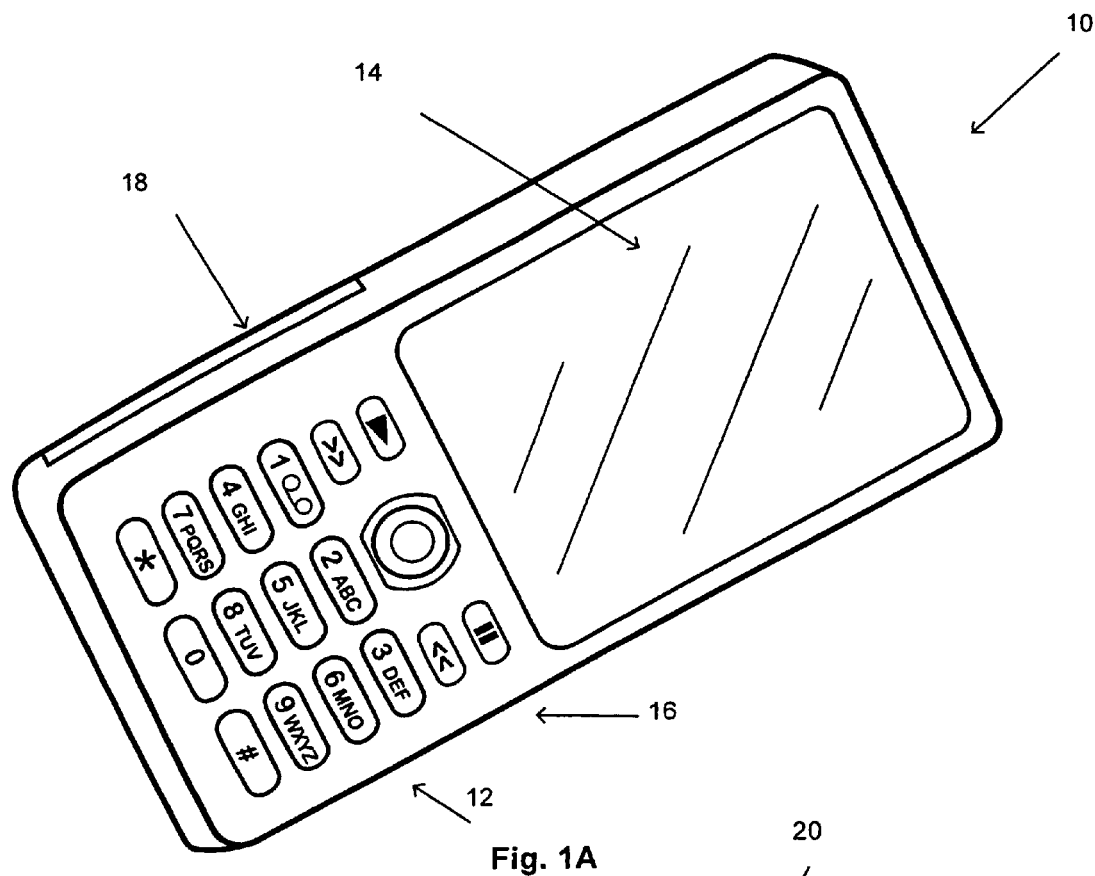
FIGS. 1A and 1B are perspective and side views of a mobile phone containing a disc drive adapted to display content from an optical disc in accordance with this invention.
Figure 1B:
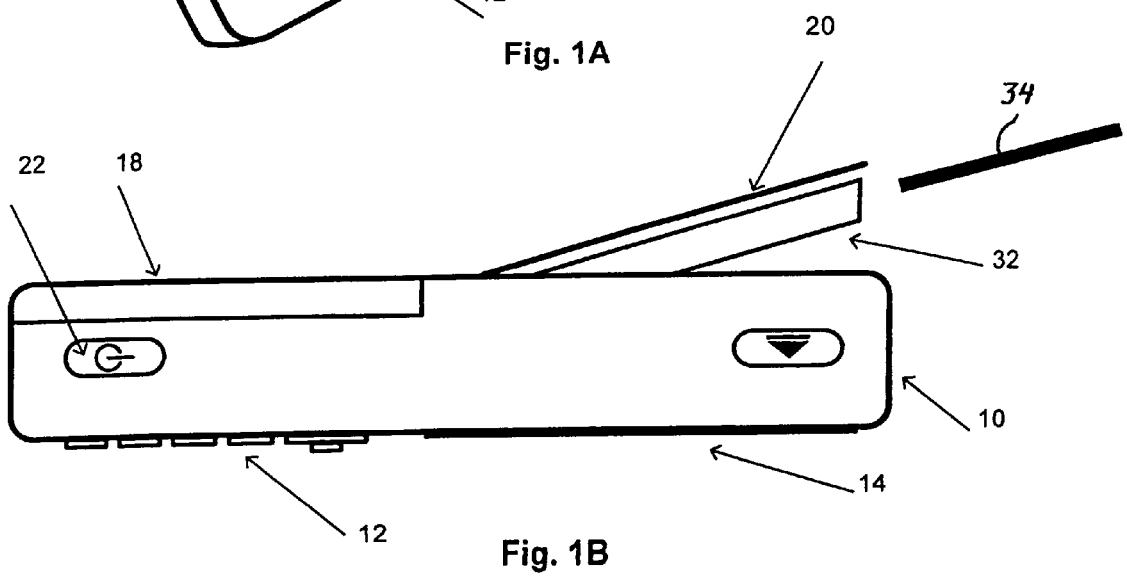

FIGS. 1A and 1B are external views of a mobile phone 10 containing an optical disc drive of the kind described above. The components of mobile phone 10 are enclosed in a housing 11, typically made of plastic. The front side of housing 11 supports a keypad 12 and a video display 14. Between keypad 12 and display 14 is a set of disc drive controls 16, including, for example, "play," "fast forward," "pause" and "reverse" buttons. As shown in FIG. 1B, the back side of housing 11 includes a battery compartment access door 18 and an optical disc drive access door 20. When a disc eject button 22 is depressed, drive access door 20 and a cartridge load module 32 swing outward, allowing a cartridge 34 containing the optical disc to be inserted into a cartridge load module 32.

Figure 2:
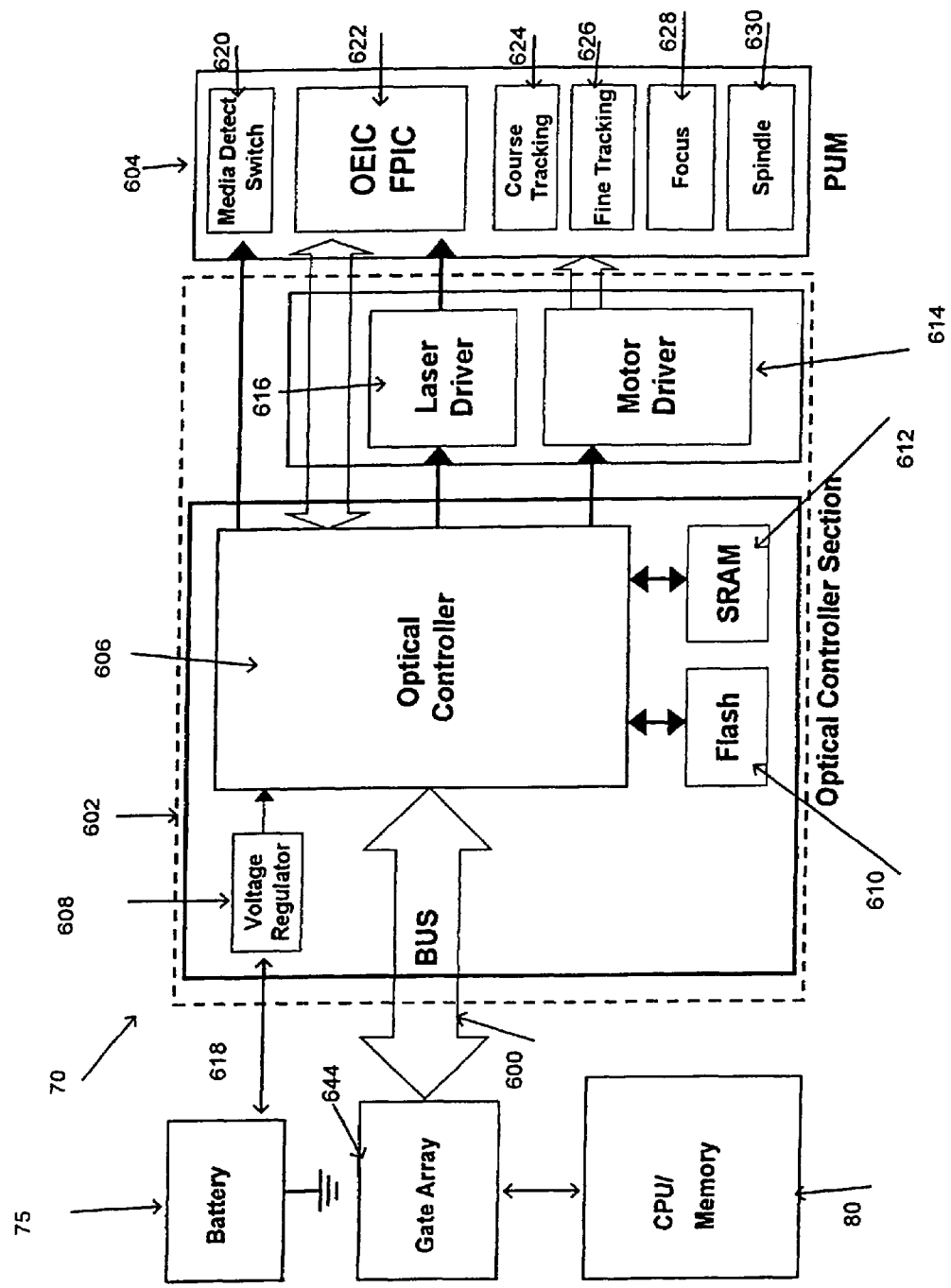
FIG. 2 is a block diagram of the electronic components of the disc drive and mobile phone.

A block diagram of optical drive electronics 70 and a battery 75 and CPU/memory 80 inside mobile phone 10 are shown in FIG. 2. CPU/memory 80 can be connected to optical drive electronics 70 via a bus 600. Optical drive electronics 70 contains two basic components: an optical controller section 602 and a pick-up module 604. The main element of optical controller section 602 is an optical controller IC 606.

The optical controller section 602 also contains a voltage regulator 608, a flash memory 610, a static random-access memory (SRAM) 612, a motor driver IC 614 and a laser driver IC 616. Motor driver IC 614 and laser driver IC 616 receive control signals from the optical controller IC 606. Voltage regulator 608 is powered by a direct connection 618 to battery 75 of mobile phone 10 and is controlled by an on/off control line that is connected to CPU/memory 80 via bus 600. The software player would typically reside in a nonvolatile memory in CPU/memory 80

The other major component of optical drive electronics 70 is pick-up module 604. Pick-up module 604 includes a media detect switch 620, an opto-electric IC (OEIC) and forward photodiode IC (FPIC) 622, course tracking control circuitry 624, fine tracking control circuitry 626, focus control circuitry 628 and the spindle motor control circuitry 630.

The digital controller IC within optical controller IC 606 includes the servo digital signal processor (DSP) required to implement the servo/seek functions of the optical disc drive, the microprocessor required to control the disc drive and the interface between the disc drive and mobile phone 10, the analog-to-digital (A/D) and digital-to-analog (D/A) converters required to interface to optical pick-up module 604, the read-back channel, the encoder-decoder (EnDec), the error correction circuitry (ECC), the media detect switch, and the physical format circuitry.

The front-end processor within optical controller IC 606 includes the analog circuitry required to interface the electronics within the pick-up module 604, such as the OEIC/FPIC 622, with the digital controller IC. The front-end processor also contains the analog electronics required to control motor driver IC 614 and laser driver IC 616 in addition to analog equalizers for the data channel.

Flash memory 610 contains the operating software (firmware) for the microprocessor within optical controller IC 606 and SRAM memory 612 can be used to buffer the data being read from optical disc 400.

Motor driver IC 614 is required to drive the carriage drive (coarse tracking) motor 370, the fine servo motor 500, and the motor in spindle assembly 50.

A user begins the process of playing the optical disc by opening the door 20 and inserting cartridge 34 into mobile phone. Closing the door 20 causes the software player inside the disc drive to read and identify the type of content stored on the optical disc within cartridge 34 by means of flags in the lead-in portion of the disc. If the disc is marked to contain the desired type of content, the optical drive reports this information to the mobile phone, which then activates the software player environment.

The optical disc contains a description file in Extensible Markup Language (XML). The software player initially requests an XML description file that is stored on the disc. The XML description file contains one or more screens to be shown in display 14 or on an external display with the video signal transmitted through an analog or digital video output port. Together the series of screens form a menu that is used to access the entertainment or other content on the disc. Upon parsing the XML description file, the player will identify the screen that has been marked as the default screen. If no screen is marked as default, the first screen listed in the XML description file is then considered the default.

The software player then begins to parse the information in the first screen in the XML description file, which may include graphic, video and audio objects. These objects are referenced by the XML description file and the file associated with each object is stored on the disc. The software player then requests the files referenced by the screen. Once each file of the screen has been received by the player, the player decodes the file and begins to use the screen layout description to composite the screen for presentation to the user on display 14 or on an external display with the video signal transmitted through an analog or digital video output port. Thus screens are built from the definition listed in the XML description file and the graphic, audio and video objects stored on the disc.

A single screen typically provides a graphical interface to the user to obtain access to at least one presentation and potentially to additional screens. Objects defined in a screen may have actions associated with them that instruct the player. The user has the option of instigating these actions by means of navigating through the objects of the screen and selecting one. Ultimately, the user begins the playback of the main audio/video content by instigating that action via the graphical interface provided by a screen. The audio/video content (presentation) contains audio and video data that is presented to the user sequentially.

To summarize, the XML description file provides file location information, menu layout and functionality information, and audio/video presentation information for the content stored on the optical disc. The former contains a general Information section, which provides information allowing a content owner to easily identify the content associated within the XML description file (for example, the title of the main content and a copyright notice), and a presentation Information section, which contains a list of the audio/video content (presentations) stored on the disc.

The menu information section is a part of the menu system resource data that allows the software player to present an organized system of access control to the user in the form of a graphical interface. This graphical interface allows a user to select screens or audio/video content to view and alter the compositing of a screen. In one embodiment, the maximum recommended size of the menu system resource data is 15 megabytes (MB).

A single XML document, named vvd_menu.xml, is located at the root of the disc file system. The vvd_menu.xml document may be created during content authoring and may be required to be validated against a schema document. Preferably, the schema document is valid to the W3C XML Schema, which can be found at http://www.w3.org/2001/XMLSchema.

The definition of the menu system XML schema is shown in the Appendix. The "function element" contains a limited set of application program interface (API) commands. By limiting the set of available commands that the software player is responsible for exhibiting, a limited set of functionality and incompatibilities between commands is lowered. The commands include the ability to begin playback of a presentation, begin playback of a presentation at a specific time in the presentation, as cross-referenced to an element contained in the XML description file, begin playback of a presentation and return to the graphical interface screen that contained the command to initiate playback, begin playback of a presentation at a specific time in the presentation, as cross-referenced to an element contained in the XML description file and return to the graphical interface screen that contained the command to initiate playback, change graphical interface screens from the current screen to another screen defined in the XML description file, set the audio or subtitle track that will be used during playback of a presentation, change menu object source, compositing location, compositing dimensions.

The display frame of the screens which constitute the access control system is quantified in pixels to match the common sizing methodology of graphical content creation applications and output displays. The access control display frame is fixed at the highest resolution of primary video output with an aspect ratio of 16:9 anamorphic widescreen.

The content of presentations is encoded using MPEG4 AVC (H.264). However, the set of MPEG4 AVC bitstream decoding elements is reduced so as to limit the resources required by the software player while maximizing the quality of the video output. Beginning with MPEG4 AVC standard profiles (e.g., profile High) and levels (e.g. level 3) and discarding specific elements, a finely-tuned list of decoder requirements is established. Non-essential elements, such as the 4:0:0 color format and video field decoding are removed from the player decoding requirements list. Interlaced source data is deinterlaced using the highest quality methods before it is encoded and stored on the disc.

Additionally, the average and peak bit rates of both video and audio content are limited to decrease the chances that different content titles will tax the software player beyond its playback capabilities. In one embodiment, the combined average bitrate is limited to 2048 kilobits per second (kbps). Video data is limited to 1597 kbps; audio data is limited to 448 kbps; and the security and subtitle data is limited to 3 kbps. The peak bitrate of the combined data stream is limited to 8000 kbps and the maximum duration of the peak bitrate is set at 3 seconds.

A presentation may be encoded on the disc in one of several frame sizes (width/height) and may be shown on an output display in one of several frame sizes, e.g., the format of NTSC, PAL, enhanced definition TV, HDTV as well as common computer displays such as 320×240, 400×240, 640×480, 480×272, 800×480, 854×480. Therefore, the data must be scaled, and for this purpose various data points of the intended display content and the identified output resolution are incorporated into a scaling algorithm. The scaling algorithm is designed to ensure that no unintended distortion and any intended distortion of the content is incorporated into the scaling process with the final output matching the output display resolution.

The algorithm can be described as follows:

Let $W_D$=Display Width $H_D$=Display Height $W_E$=Encoded Frame Width $H_E$=Encoded Frame Height $W_T$=Target Width $H_T$=Target Height PAR=Pixel Aspect Ratio (as stored in the MPEG4 file format header)

The Target Height $H_D$ is calculated as follows:

If $(W_D/H_D)>((W_E*PAR)/H_E)$

Then $H_T=H_D$

Else $H_T=H_D/(((W_E*PAR)/H_E)/W_D/H_D)$

The Target Width is calculated from the Target Height as follows:

$W_T=H_T*((W_E*PAR)/H_E)$

The Target Height and Target Width represent the height and width to which the encoded data are scaled to provide an optimal full-screen playback The player software creates a black matte to fill the top/bottom or left/right of the display if the video frame does not match the display frame. The video frame is centered in the display frame.

For 16:9 displays, the player software provides a stretch function to present a 4:3 presentation in full-screen height and width, with no black areas along the edges of the display. In addition, the player is capable of "zooming" to fit the presentation to the height and width of the display, i.e., by cropping or discarding data from the top/bottom or left/right sides of the frame.

The pixel width and height of all encoded frames must be divisible by eight. Except as necessary to satisfy the multiple-of-eight requirement, black matte is not included in the encoded content frame.

For presentations encoded in a 4:3 format, a pixel aspect ratio (PAR) of 1:1 is specified in the MPEG4 file header. The encoded frame size is 640 pixels wide by 480 pixels high.

For widescreen presentations, the encoded frame size is from 648 to 720 pixels wide and up to 480 pixels high. The pixel aspect ratio (PAR) is specified in the MPEG4 file header. The following are several examples:

1.5:1 content is 720×480, encoded at 720×480 with a PAR of 1:1.

1.66:1 content is 800×480, encoded at anamorphic 720×480 with a PAR of 1.11:1.

1.78:1 content is 854×462, encoded at anamorphic 720×480 with a PAR of 1.186:1.

1.85:1 content is 854×462, encoded at anamorphic 720×464 (matte of two total lines of black, top and bottom) with a PAR of 1.186:1.

2.40:1 (2.39:1) content is 854×356, encoded at anamorphic 720×360 (matte of four total lines of black, top and bottom) with a PAR of 1.186:1.

While specific embodiments of this invention have been described, it is to be understood that these embodiments are illustrative and not limiting. Many alternative or additional embodiments in accordance with the broad scope of this invention will be apparent to persons of skill in the art.

APPENDIX

| Disc | |
|---|---|
| XML menu root element | |
| Type | Sub-element container |
| Parent Element | n/a |
| Required | Yes |
| Value Type | Sub-elements |
| Value Restriction | Info sub-element Menu sub-element |
| Default Value | |
| Minimum Occurrence | 1 |
| Maximum Occurrence | 1 |
| Example | <Vmedia_Disc xmlns=" http://www.vmedia.net/XML/VmediaVideoDisc/ MenuSystem/2006-07-05" xmlns:xsi="http://www.w3.org/2001/ XMLSchema-instance" xsi:schemaLocation=" http://www.vmedia.net/XML/ VmediaVideoDisc/MenuSystem/2006-07-05 vmv_menu.xsd"> |

| Generation | |
|---|---|
| Attribute used to describe disc generation | |
| Type | Attribute |
| Parent Element | Vmedia_Disc |
| Required | No |
| Value Type | String |
| Value Restriction | |
| Default Value | 1 G |
| Minimum Occurrence | 0 |
| Maximum Occurrence | 1 |
| Example | <Vmedia_Disc generation="2G" xmlns=" http://www.vmedia.net/XML/ VmediaVideoDisc/MenuSystem/2006-07-05" xmlns:xsi="http://www. w3.org/2001/ XMLSchema-instance" xsi:schemaLocation=" http://www.vmedia.net/XML/ VmediaVideoDisc/MenuSyste m/2006-07-05 vmv_menu.xsd"> |

| Info | |
|---|---|
| Used to provide meta data information for a specific piece of authored content | |
| Type | Sub-element container |
| Parent Element | Vmedia_Disc |
| Required | Yes |
| Value Type | Sub-elements |
| Value Restriction | title sub-element owner sub-element copyright sub-element |
| Default Value | |
| Minimum Occurrence | 1 |
| Maximum Occurrence | 1 |
| Example | <Info> <sub-elements ... /> </Info> |

| Title | |
|---|---|
| Used to specify the title of the authored content | |
| Type | Value container |
| Parent Element | Info |
| Required | No |
| Value Type | String |
| Value Restriction | |
| Default Value | |
| Minimum Occurrence | 0 |
| Maximum Occurrence | 1 |
| Example | <title>Breakfast At Ridgemont High</title> |

| Owner | |
|---|---|
| Used to specify the owner of the authored content | |
| Type | Value container |
| Parent Element | Info |
| Required | No |
| Value Type | String |
| Value Restriction | |
| Default Value | |
| Minimum Occurrence | 0 |
| Maximum Occurrence | 1 |
| Example | <owner>Oligarch Studios</owner> |

| Copyright | |
|---|---|
| Used to specify copyright information of the content of the disc | |
| Type | Value container |
| Parent Element | Info |
| Required | No |
| Value Type | String |
| Value Restriction | |
| Default Value | |
| Minimum Occurrence | 0 |
| Maximum Occurrence | 1 |
| Example | <copyright>2005</copyright> |

| Menu | |
|---|---|
| Used to specify the list of screens within the menu system on the disc | |
| Type | Sub-element container |
| Parent Element | Vmedia_Disc |
| Required | Yes |
| Value Type | Sub-elements |
| Value Restriction | Screen sub-element |
| Default Value | |
| Minimum Occurrence | 1 |
| Maximum Occurrence | 1 |
| Example | <Menu><sub-elements ... /></Menu> |

| Screen | |
|---|---|
| Used to specify an instance of a single screen within the menu system | |
| Type | Sub-element container |
| Parent Element | Menu |
| Required | Yes |

| Screen | |
|---|---|
| Used to specify an instance of a single screen within the menu system | |
| Type | Sub-element container |
| Value Type | Sub-elements |
| Value Restriction | Layer sub-element |
| Default Value | |
| Minimum Occurrence | 1 |
| Maximum Occurrence | 999 |
| Example | <Screen><sub-elements ... /></Screen> |

| Layer | |
|---|---|
| Used to specify a display layer of a single instance of a screen | |
| Type | Sub-element container |
| Parent Element | Screen |
| Required | Yes |
| Value Type | Sub-elements |
| Value Restriction | z_index sub-element Object sub-element |
| Default Value | |
| Minimum Occurrence | 1 |
| Maximum Occurrence | 999 |
| Example | <Layer><br><sub-elements ... /><br></Layer> |

| z_index | |
|---|---|
| Used to specify the layering order of a single instance of a layer. Layers with lower values are rendered behind layers with higher values. | |
| Type | Value container |
| Parent Element | Layer |
| Required | Yes |
| Value Type | Non-negative integer |
| Value Restriction | |
| Default Value | |
| Minimum Occurrence | 1 |
| Maximum Occurrence | 1 |
| Example | <z_index>3</z_index> |

| Object | |
|---|---|
| Used to specify a single instance of an object within a layer. Objects can be buttons or non-buttons. | |
| Type | Sub-element container |
| Parent Element | Layer |
| Required | Yes |
| Value Type | Sub-elements |
| Value Restriction | id sub-element<br>source sub-element<br>LocationTop sub-element<br>LocationLeft sub-element<br>Width sub-element<br>Height sub-element<br>Button sub-element |
| Default Value | |
| Minimum Occurrence | 1 |
| Maximum Occurrence | 999 |
| Example | <Object><br><sub elements ... /><br></Object> |

| id | |
|---|---|
| Used to specify an identification of an object | |
| Type | Value container |
| Parent Element | Object |
| Required | Yes |
| Value Type | String |
| Value Restriction | |
| Default Value | |
| Minimum Occurrence | 1 |
| Maximum Occurrence | 1 |
| Example | <id>Background</id> |

| Source | |
|---|---|
| Used to specify a relative path and file name to a piece of media displayed as an object | |
| Type | Value container |
| Parent Element | Object |
| Required | Yes |
| Value Type | String |
| Value Restriction | MP4 file type PNG file type M4A file type |
| Default Value | |
| Minimum Occurrence | 1 |
| Maximum Occurrence | 1 |
| Example | <source>menu/background.png</source> |

| LocationTop | |
|---|---|
| Used to specify top starting display coordinate of the object | |
| Type | Sub-element container |
| Parent Element | Object |
| Required | Yes |
| Value Type | Sub-elements |
| Value Restriction | unit sub-element quantity sub-element |
| Default Value | |
| Minimum Occurrence | 1 |
| Maximum Occurrence | 1 |
| Example | <LocationTop><br><sub-elements ... /><br></LocationTop> |

| Unit | |
|---|---|
| Used to specify the units of measurement of the LocationTop element | |
| Type | Value container |
| Parent Element | LocationTop |
| Required | Yes |
| Value Type | String |
| Value Restriction | pixels<br>percent |
| Default Value | |
| Minimum Occurrence | 1 |
| Maximum Occurrence | 1 |
| Example | <unit>pixels</unit> |

| Quantity | |
|---|---|
| Used to specify the quantity of units of the LocationTop element | |
| Type | Value container |
| Parent Element | LocationTop |
| Required | No |
| Value Type | Non-negative Integer |
| Value Restriction | |
| Default Value | 0 |
| Minimum Occurrence | 0 |
| Maximum Occurrence | 1 |
| Example | <quantity>128</quantity> |

| LocationLeft | |
|---|---|
| Used to specify left starting display coordinate of the object | |
| Type | Sub-element container |
| Parent Element | Object |
| Required | Yes |
| Value Type | Sub-elements |
| Value Restriction | unit sub-element quantity sub-element |
| Default Value | |
| Minimum Occurrence | 1 |
| Maximum Occurrence | 1 |
| Example | <LocationLeft><sub-elements ... /> </LocationLeft> |

| Unit | |
|---|---|
| Used to specify the units of measurement of the LocationLeft element | |
| Type | Value container |
| Parent Element | LocationLeft |
| Required | Yes |
| Value Type | String |
| Value Restriction | pixels<br>percent |
| Default Value | |
| Minimum Occurrence | 1 |
| Maximum Occurrence | 1 |
| Example | <unit>pixels</unit> |

| Quantity | |
|---|---|
| Used to specify the quantity of units of the LocationLeft element | |
| Type | Value container |
| Parent Element | LocationLeft |
| Required | No |
| Value Type | Non-negative Integer |
| Value Restriction | |
| Default Value | 0 |
| Minimum Occurrence | 0 |
| Maximum Occurrence | 1 |
| Example | <quantity>128</quantity> |

| Width | |
|---|---|
| Used to specify display width of the object | |
| Type | Sub-element container |
| Parent Element | Object |
| Required | Yes |
| Value Type | Sub-elements |
| Value Restriction | unit sub-element quantity sub-element |
| Default Value | |
| Minimum Occurrence | 1 |
| Maximum Occurrence | 1 |
| Example | \<Width\> |
| | \<sub-elements ... /\> |
| | \</Width\> |

| Unit | |
|---|---|
| Used to specify the units of measurement of the Width element | |
| Type | Value container |
| Parent Element | Width |
| Required | Yes |
| Value Type | String |
| Value Restriction | pixels |
| Default Value | |
| Minimum Occurrence | 1 |
| Maximum Occurrence | 1 |
| Example | \<unit\>pixels\</unit\> |

| Quantity | |
|---|---|
| Used to specify the quantity of units of the Width element | |
| Type | Value container |
| Parent Element | Width |
| Required | Yes |
| Value Type | Positive Integer |
| Value Restriction | |
| Default Value | |
| Minimum Occurrence | 1 |
| Maximum Occurrence | 1 |
| Example | \<quantity\>32\</quantity\> |

| Height | |
|---|---|
| Used to display height of the object | |
| Type | Sub-element container |
| Parent Element | Object |
| Required | Yes |
| Value Type | Sub-elements |
| Value Restriction | unit sub-element |
| | quantity sub-element |
| Default Value | |
| Minimum Occurrence | 1 |
| Maximum Occurrence | 1 |
| Example | \<Height\> |
| | \<sub-elements.../\> |
| | \</Height\> |

| Unit | |
|---|---|
| Used to specify the units of measurement of the Height element | |
| Type | Value container |
| Parent Element | Height |
| Required | Yes |
| Value Type | String |
| Value Restriction | pixels |
| Default Value | |
| Minimum Occurrence | 1 |
| Maximum Occurrence | 1 |
| Example | \<unit\>pixels\</unit\> |

| Quantity | |
|---|---|
| Used to specify the quantity of units of the Height element | |
| Type | Value container |
| Parent Element | Height |
| Required | Yes |
| Value Type | Positive Integer |
| Value Restriction | |
| Default Value | |
| Minimum Occurrence | 1 |
| Maximum Occurrence | 1 |
| Example | \<quantity\>32\</quantity\> |

| Button | |
|---|---|
| Used to specify parameters pertaining to a button object. The presence of the Button element within an Object marks the object as a button. The lack of the Button element with an Object marks the object as a not-button. | |
| Type | Sub-element container |
| Parent Element | Object |
| Required | No |
| Value Type | Sub-elements |
| Value Restriction | sourceFocus sub-element sourceActive sub-element Focus sub-element Action sub-element |
| Default Value | |
| Minimum Occurrence | 0 |
| Maximum Occurrence | 1 |
| Example | \<Button\>\<sub-elements ... /\> \</Button\> |

| sourceFocus | |
|---|---|
| Used to specify the relative path and file name to a piece of media displayed as a button when the button has focus. | |
| Type | Value container |
| Parent Element | Button |
| Required | Yes |
| Value Type | String |
| Value Restriction | MP4 file type PNG file type M4A file type |
| Default Value | |
| Minimum Occurrence | 1 |
| Maximum Occurrence | 1 |
| Example | \<sourceFocus\>menu/button_Chapters_focus.png\</sourceFocus\> | sourceActive
Used to specify the relative path and file name to a piece of media displayed as a button when the button is active

| | |
|---|---|
| Type | Value container |
| Parent Element | Button |
| Required | Yes |
| Value Type | String |
| Value Restriction | MP4 file type PNG file type M4A file type |
| Default Value | |
| Minimum Occurrence | 1 |
| Maximum Occurrence | 1 |
| Example | <sourceActive>menu/button_Chapters_active.png</sourceActive> |

Focus
Used to specify focus control of a button

| | |
|---|---|
| Type | Sub-element container |
| Parent Element | Button |
| Required | Yes |
| Value Type | Sub-elements |
| Value Restriction | id sub-element moveUp sub-element moveDown sub-element moveLeft sub-element moveRight sub-element default sub-element |
| Default Value | |
| Minimum Occurrence | 1 |
| Maximum Occurrence | 1 |
| Example | <Focus><br>  <sub-elements ... /><br></Focus> |

Id
Used to specify a unique id number for the focus of a button

| | |
|---|---|
| Type | Value container |
| Parent Element | Focus |
| Required | Yes |
| Value Type | Non-negative Integer |
| Value Restriction | |
| Default Value | |
| Minimum Occurrence | 1 |
| Maximum Occurrence | 1 |
| Example | <id>1</id> | moveup
Used to specify the id of a different button which will become button of focus if the user navigates "up". If not specified, no focus change occurs on an "up" navigation event.

| | |
|---|---|
| Type | Value container |
| Parent Element | Focus |
| Required | No |
| Value Type | Non-negative Integer |
| Value Restriction | |
| Default Value | |
| Minimum Occurrence | 0 |
| Maximum Occurrence | 1 |
| Example | <moveUp>3</moveUp> | moveDown
Used to specify the id of a different button which will become button of focus if the user navigates "down". If not specified, no focus change occurs on an "down" navigation event.

| | |
|---|---|
| Type | Value container |
| Parent Element | Focus |
| Required | No |
| Value Type | Non-negative Integer |
| Value Restriction | |
| Default Value | |
| Minimum Occurrence | 0 |
| Maximum Occurrence | 1 |
| Example | <moveDown>6</moveDown> | moveLeft
Used to specify the id of a different button which will become button of focus if the user navigates "left". If not specified, no focus change occurs on an "left" navigation event.

| | |
|---|---|
| Type | Value container |
| Parent Element | Focus |
| Required | No |
| Value Type | Non-negative Integer |
| Value Restriction | |
| Default Value | |
| Minimum Occurrence | 0 |
| Maximum Occurrence | 1 |
| Example | <moveLeft>4</moveLeft> | moveRight
Used to specify the id of a different button which will become button of focus if the user navigates "right". If not specified, no focus change occurs on an "right" navigation event.

| | |
|---|---|
| Type | Value container |
| Parent Element | Focus |
| Required | No |
| Value Type | Non-negative Integer |
| Value Restriction | |
| Default Value | |
| Minimum Occurrence | 0 |
| Maximum Occurrence | 1 |
| Example | <moveRight>1</moveRight> |

Default
Used to specify when the button is the default focused button on viewing the menu

| | |
|---|---|
| Type | Value container |
| Parent Element | Focus |
| Required | No |
| Value Type | Boolean |
| Value Restriction | 0 (false) 1 (true) true false |
| Default Value | False |
| Minimum Occurrence | 0 |
| Maximum Occurrence | 1 |
| Example | <default>true</default> |

| Action | |
|---|---|
| Used to specify the activation triggers of the button and the event triggered if the button is activiated | |
| Type | Sub-element container |
| Parent Element | Button |
| Required | Yes |
| Value Type | Sub-elements |
| Value Restriction | function sub-element parameter sub-element automatic sub-element timer sub-element |
| Default Value | |
| Minimum Occurrence | 1 |
| Maximum Occurrence | 999 |
| Example | <Action><br>    <sub-elements ... /><br></Action> |

| Function | |
|---|---|
| Used to specify the function performed by the player application upon activiation of the button | |
| Type | Value container |
| Parent Element | Action |
| Required | Yes |
| Value Type | String |
| Value Restriction | video.play<br>menu.replace<br>option.set<br>object.change.source<br>object.change.sourceFocus<br>object.change.sourceActive<br>object.change.locationTop.unit<br>object.change.locationTop.quantity<br>object.change.locationLeft.unit<br>object.change.locationLeft.quantity<br>object.change.width.unit<br>object.change.width.quantity<br>object.change.height.unit<br>object.change.height.quantity<br>object.play<br>object.pause |
| Default Value | |
| Minimum Occurrence | 1 |
| Maximum Occurrence | 1 |
| Example | <function>video.play</function> |

| parameter | |
|---|---|
| Used to specify a parameter sent to the function of an action | |
| Type | Value container |
| Parent Element | Action |
| Required | No |
| Value Type | String |
| Value Restriction | |
| Default Value | |
| Minimum Occurrence | 0 |
| Maximum Occurrence | 999 |
| Example | <parameter>resume |

| automatic | |
|---|---|
| Used to specify whether the action is automatically triggered on focus as opposed to requiring a user activate the button | |
| Type | Value container |
| Parent Element | Action |
| Required | No |
| Value Type | Boolean |
| Value Restriction | 0 (false) 1 (true) true false |
| Default Value | false |
| Minimum Occurrence | 0 |
| Maximum Occurrence | 1 |
| Example | <automatic>1</automatic> |

| timer | |
|---|---|
| Used to specify an interval in milliseconds after which the action is triggered automatically. A 0 value or is the timer is unspecified means the timer is not applicable | |
| Type | Value container |
| Parent Element | Action |
| Required | No |
| Value Type | Non-negative integer |
| Value Restriction | 0-14400000 |
| Default Value | 0 |
| Minimum Occurrence | 0 |
| Maximum Occurrence | 1 |
| Example | <timer>60000</timer> |

We claim:

1. A method of determining a target width ($W_T$) and a target height ($H_T$) of a video frame, measured in pixels, from a height $H_E$ and a width $W_E$ of an encoded video frame, measured in pixels, the method comprising:
 comparing the magnitude of ($W_D/H_D$) with the magnitude of (($W_E*PAR)/H_E$), where $W_D$ and $H_D$ are a width and a height, respectively, of a display, measured in pixels, and PAR is a pixel aspect ratio;
 if ($W_D/H_D$) is greater than (($W_E*PAR)/H_E$), setting $H_T$ equal to $H_D$;
 if ($W_D/H_D$) is less than or equal to (($W_E*PAR)/H_E$), setting $H_T$ equal to $H_D/((( W_E*PAR)/H_E)/W_D/H_D)$; and setting $W_T$ equal to $H_T*((W_E*PAR)/H_E)$, where $H_T$ is the target height as determined above;
 wherein the method is performed using a microprocessor.

* * * * *